US012766909B2

(12) United States Patent
Roberts et al.

(10) Patent No.: US 12,766,909 B2
(45) Date of Patent: Oct. 20, 2026

(54) VEHICLE TEMPERATURE CONTROL ASSEMBLY AND SYSTEM

(71) Applicant: JAGUAR LAND ROVER LIMITED, Whitley (GB)

(72) Inventors: Chris Roberts, Buckingham (GB); Marc Llusa Juny, Coventry (GB); Chris Chatham, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 164 days.

(21) Appl. No.: 18/767,818

(22) Filed: Jul. 9, 2024

(65) Prior Publication Data

US 2026/0014828 A1 Jan. 15, 2026

(51) Int. Cl.
*B60H 1/00* (2006.01)

(52) U.S. Cl.
CPC ..... *B60H 1/00278* (2013.01); *B60H 1/00885* (2013.01); *B60H 2001/00307* (2013.01); *B60H 2001/00928* (2013.01)

(58) Field of Classification Search
CPC ............ B60H 1/00278; B60H 1/00885; B60H 2001/00307; B60H 2001/00927
See application file for complete search history.

(56) References Cited

U.S. PATENT DOCUMENTS

| | | | | |
|---|---|---|---|---|
| 6,691,523 | B1 * | 2/2004 | Sangwan | B60H 1/3208 62/133 |
| 2002/0184908 | A1 * | 12/2002 | Brotz | B60H 1/143 62/198 |
| 2017/0217279 | A1 * | 8/2017 | Jalilevand | B60H 1/00885 |
| 2021/0370799 | A1 * | 12/2021 | Li | H01M 10/6568 |

* cited by examiner

*Primary Examiner* — Jonathan Bradford
(74) *Attorney, Agent, or Firm* — McCoy Russell LLP

(57) ABSTRACT

The disclosure relates to a vehicle temperature control assembly having a heat exchanger; a battery temperature control circuit; and a vehicle air conditioning circuit having an engine driven compressor, wherein the heat exchanger is configured to transfer heat between the battery temperature control circuit and the vehicle air conditioning circuit. The disclosure also relates to a vehicle temperature control system, a vehicle subassembly and to a vehicle.

20 Claims, 4 Drawing Sheets

VEHICLE TEMPERATURE CONTROL ASSEMBLY AND SYSTEM

TECHNICAL FIELD

The present disclosure relates to a temperature control assembly. More specifically, the present disclosure relates to a temperature control assembly for a vehicle, and in particular a mild hybrid electric vehicle. Aspects of the disclosure relate to a vehicle temperature control assembly, a vehicle temperature control system, a method of using a vehicle temperature control assembly, a method of controlling the temperature of a battery of a vehicle, and to a vehicle.

BACKGROUND

Mild hybrid electric vehicles (MHEV) combine a traditional internal combustion engine powertrain system with an on-board battery, generator and motor system. MHEVs may provide power assist to the internal combustion engine, but cannot be driven in an electric-only mode. The on-board battery is used to power components that would normally rely on the internal combustion engine.

In order to maximise battery performance, the on-board battery must be kept within a predetermined operational temperature range. Providing the necessary cooling and/or heating to the on-board battery and surrounding ancillary components provides a number of challenges in the case of MHEVs.

SUMMARY OF THE DISCLOSURE

It is an aim of the present disclosure to address one or more of the disadvantages associated with the prior art.

An aspect relates to a vehicle temperature control assembly comprising: a heat exchanger; a battery temperature control circuit; and a vehicle air conditioning circuit having an engine driven compressor; wherein the heat exchanger comprises a first fluid channel in fluid communication with the battery temperature control circuit for receiving coolant therefrom and a second fluid channel in fluid communication with the vehicle air conditioning circuit for receiving refrigerant therefrom so as to transfer heat therebetween.

A further aspect relates to a mild hybrid electric vehicle temperature control assembly comprising: a heat exchanger; a battery temperature control circuit; and a vehicle air conditioning circuit having an engine driven compressor; wherein the heat exchanger comprises a first fluid channel in fluid communication with the battery temperature control circuit for receiving coolant therefrom and a second fluid channel in fluid communication with the vehicle air conditioning circuit for receiving refrigerant therefrom so as to transfer heat therebetween.

A further aspect relates to a vehicle temperature control assembly comprising: a heat exchanger; a battery temperature control circuit; and a vehicle air conditioning circuit having an internal combustion engine driven compressor; wherein the heat exchanger comprises a first fluid channel in fluid communication with the battery temperature control circuit for receiving coolant therefrom and a second fluid channel in fluid communication with the vehicle air conditioning circuit for receiving refrigerant therefrom so as to transfer heat therebetween.

A further aspect relates to a mild hybrid electric vehicle temperature control assembly comprising: a heat exchanger; a battery temperature control circuit; and a vehicle air conditioning circuit having an internal combustion engine driven compressor; wherein the heat exchanger comprises a first fluid channel in fluid communication with the battery temperature control circuit for receiving coolant therefrom and a second fluid channel in fluid communication with the vehicle air conditioning circuit for receiving refrigerant therefrom so as to transfer heat therebetween.

A further aspect relates to a vehicle temperature control assembly comprising: a heat exchanger; a battery coolant circuit; and a vehicle air conditioning circuit having an engine driven compressor; wherein the heat exchanger comprises a first fluid channel in fluid communication with the battery coolant circuit for receiving coolant therefrom and a second fluid channel in fluid communication with the vehicle air conditioning circuit for receiving refrigerant therefrom so as to transfer heat therebetween.

A further aspect relates to a vehicle temperature control assembly comprising: a heat exchanger; a battery coolant circuit; and a vehicle air conditioning circuit having an internal combustion engine driven compressor; wherein the heat exchanger comprises a first fluid channel in fluid communication with the battery coolant circuit for receiving coolant therefrom and a second fluid channel in fluid communication with the vehicle air conditioning circuit for receiving refrigerant therefrom so as to transfer heat therebetween.

A further aspect relates to a vehicle temperature control assembly comprising: a heat exchanger; a battery; a battery coolant circuit arranged to regulate the temperature of the battery; and a vehicle air conditioning circuit having an engine driven compressor; wherein the heat exchanger comprises a first fluid channel in fluid communication with the battery coolant circuit for receiving coolant therefrom and a second fluid channel in fluid communication with the vehicle air conditioning circuit for receiving refrigerant therefrom so as to transfer heat therebetween.

A further aspect relates to a vehicle temperature control assembly comprising: a heat exchanger; a battery; a battery coolant circuit arranged to regulate the temperature of the battery; and a vehicle air conditioning circuit having an internal combustion engine driven compressor; wherein the heat exchanger comprises a first fluid channel in fluid communication with the battery coolant circuit for receiving coolant therefrom and a second fluid channel in fluid communication with the vehicle air conditioning circuit for receiving refrigerant therefrom so as to transfer heat therebetween.

A further aspect relates to a vehicle temperature control assembly comprising: a heat exchanger; a battery; a battery temperature control circuit arranged to regulate the temperature of the battery; and a vehicle air conditioning circuit having an engine driven compressor; wherein the heat exchanger comprises a first fluid channel in fluid communication with the battery temperature control circuit for receiving coolant therefrom and a second fluid channel in fluid communication with the vehicle air conditioning circuit for receiving refrigerant therefrom so as to transfer heat therebetween.

A further aspect relates to a vehicle temperature control assembly comprising: a heat exchanger; a battery; a battery temperature control circuit arranged to regulate the temperature of the battery; and a vehicle air conditioning circuit having an internal combustion engine driven compressor; wherein the heat exchanger comprises a first fluid channel in fluid communication with the battery temperature control circuit for receiving coolant therefrom and a second fluid channel in fluid communication with the vehicle air conditioning circuit for receiving refrigerant therefrom so as to transfer heat therebetween.

A further aspect relates to a vehicle temperature control assembly comprising: a heat exchanger; a battery temperature control circuit in fluid communication with the heat exchanger and configured to convey a coolant therethrough; and a vehicle air conditioning circuit in fluid communication with the heat exchanger and configured to convey a refrigerant therethrough, wherein the vehicle air conditioning circuit comprises an engine driven compressor; wherein the heat exchanger is configured to transfer heat between the coolant and the refrigerant.

A further aspect relates to a vehicle temperature control assembly comprising: a heat exchanger; a battery temperature control circuit in fluid communication with the heat exchanger; and a vehicle air conditioning circuit in fluid communication with the heat exchanger, wherein the vehicle air conditioning circuit comprises an engine driven compressor; wherein the heat exchanger is configured to receive coolant from the battery temperature control circuit and refrigerant from the vehicle air conditioning circuit and to transfer heat between the coolant and the refrigerant.

A further aspect relates to a vehicle temperature control system comprising: a heat exchanger; a battery temperature control circuit in fluid communication with the heat exchanger and configured to convey a coolant therethrough; a battery temperature sensor configured to determine the temperature of a battery, in use; and a vehicle air conditioning circuit in fluid communication with the heat exchanger and configured to convey a refrigerant therethrough, wherein the vehicle air conditioning circuit comprises: an engine driven compressor; a valve configured to control the fluid communication between the vehicle air conditioning circuit and the heat exchanger; and an air conditioning circuit controller configured to control an operational state of the valve; wherein the system is configured to control the transfer of heat between the coolant and the refrigerant via the heat exchanger.

A further aspect relates to a mild hybrid electric vehicle temperature control system comprising: a heat exchanger; a battery temperature control circuit in fluid communication with the heat exchanger and configured to convey a coolant therethrough; a battery temperature sensor configured to determine the temperature of a battery, in use; and a vehicle air conditioning circuit in fluid communication with the heat exchanger and configured to convey a refrigerant therethrough, wherein the vehicle air conditioning circuit comprises: an engine driven compressor; a valve configured to control the fluid communication between the vehicle air conditioning circuit and the heat exchanger; and an air conditioning circuit controller configured to control an operational state of the valve; wherein the system is configured to control the transfer of heat between the coolant and the refrigerant via the heat exchanger.

A further aspect relates to a vehicle temperature control system comprising: a heat exchanger; a battery coolant circuit in fluid communication with the heat exchanger and configured to convey a coolant therethrough; a battery temperature sensor configured to determine the temperature of a battery, in use; and a vehicle air conditioning circuit in fluid communication with the heat exchanger and configured to convey a refrigerant therethrough, wherein the vehicle air conditioning circuit comprises: an engine driven compressor; a valve configured to control the fluid communication between the vehicle air conditioning circuit and the heat exchanger; and an air conditioning circuit controller configured to control an operational state of the valve; wherein the system is configured to control the transfer of heat between the coolant and the refrigerant via the heat exchanger.

A further aspect relates to a vehicle temperature control system comprising: a heat exchanger; a battery temperature control circuit in fluid communication with the heat exchanger and configured to convey a coolant therethrough; a temperature sensor configured to determine the temperature of a battery, in use; and a vehicle air conditioning circuit in fluid communication with the heat exchanger and configured to convey a refrigerant therethrough, wherein the vehicle air conditioning circuit comprises: an internal combustion engine driven compressor; a valve configured to control the fluid communication between the vehicle air conditioning circuit and the heat exchanger; and a controller configured to control an operational state of the valve; wherein the system is configured to control the transfer of heat between the coolant and the refrigerant via the heat exchanger.

A further aspect relates to a vehicle temperature control system comprising: a heat exchanger; a battery; a battery temperature control circuit in fluid communication with the heat exchanger and configured to convey a coolant therethrough; a temperature sensor configured to determine the temperature of the battery, in use; and a vehicle air conditioning circuit in fluid communication with the heat exchanger and configured to convey a refrigerant therethrough, wherein the vehicle air conditioning circuit comprises: an internal combustion engine driven compressor; a valve configured to control the fluid communication between the vehicle air conditioning circuit and the heat exchanger; and a controller configured to control an operational state of the valve; wherein the system is configured to control the transfer of heat between the coolant and the refrigerant via the heat exchanger.

A further aspect relates to a vehicle temperature control assembly comprising: a power electronics module comprising a battery and a DC-DC converter; a battery temperature control circuit comprising a conduit configured to convey a coolant; wherein the conduit is configured for fluid connection with a heat exchanger; wherein at least a portion of the conduit extends around and/or through a housing of the battery and/or around and/or through a housing of the DC-DC converter.

A further aspect relates to a vehicle temperature control assembly comprising: a power electronics module comprising a battery and a DC-DC converter; at least part of a battery temperature control circuit comprising a conduit configured to convey a coolant; wherein the conduit is configured for fluid connection with a heat exchanger; wherein at least a portion of the conduit extends around and/or through a housing of the battery and/or around and/or through a housing of the DC-DC converter.

A further aspect relates to a vehicle temperature control circuit comprising: a mild hybrid electric vehicle power module comprising a battery and a DC-DC converter; a battery temperature control circuit comprising a conduit configured to convey a coolant; wherein the conduit is configured for fluid connection with a heat exchanger;

wherein at least a portion of the conduit extends around and/or through a housing of the battery and/or around and/or through a housing of the DC-DC converter.

A further aspect relates to a mild hybrid electric vehicle battery temperature control assembly comprising: a power electronics module comprising a battery and a DC-DC converter; at least part of a battery temperature control circuit comprising a conduit configured to convey a coolant;

wherein the conduit is configured for fluid connection with a heat exchanger; wherein at least a portion of the conduit extends around and/or through a housing of the battery and/or around and/or through a housing of the DC-DC converter.

A further aspect relates to a vehicle temperature control assembly comprising: a power electronics module comprising a battery and a DC-DC converter; a battery cooling circuit comprising a conduit configured to convey a coolant; wherein the conduit is configured for fluid connection with a heat exchanger; wherein at least a portion of the conduit extends around and/or through a housing of the battery and/or around and/or through a housing of the DC-DC converter.

A further aspect relates to a vehicle temperature control assembly comprising: a power electronics module comprising a battery, an inverter and a DC-DC converter; a battery temperature control circuit comprising a conduit configured to convey a coolant; wherein the conduit is configured for fluid connection with a heat exchanger; wherein at least a portion of the conduit extends around and/or through a housing of the battery and/or around and/or through a housing of the DC-DC converter and/or around and/or through a housing of the inverter.

A further aspect relates to a mild hybrid electric vehicle temperature control assembly comprising: a power electronics module comprising a battery and a DC-DC converter; a battery temperature control circuit comprising a conduit configured to convey a coolant; wherein the conduit is configured for fluid connection with a heat exchanger; wherein at least a portion of the conduit extends around and/or through a housing of the battery and/or around and/or through a housing of the DC-DC converter.

A further aspect relates to a vehicle temperature control assembly comprising: a power electronics module comprising a battery and a DC-DC converter; a battery temperature control circuit comprising a conduit configured to convey a coolant;

wherein the conduit is configured for fluid connection with a heat exchanger; wherein at least a portion of the conduit is located or extends between the battery and the DC-DC converter.

A further aspect relates to a vehicle subassembly comprising a vehicle body panel having a first portion and a second portion inclined with respect to the first portion, a power electronics module comprising a battery mounted to one of the first portion and the second portion and a DC-DC converter mounted to the other of the first portion and the second portion, such that the battery and DC-DC converter are inclined with respect to one another, the subassembly further comprising a battery temperature control circuit comprising a conduit configured to convey a coolant; wherein the conduit is configured for fluid connection with a heat exchanger; wherein at least a portion of the conduit extends around and/or through a housing of the battery and/or around and/or through a housing of the DC-DC converter.

A further aspect relates to a vehicle subassembly comprising a vehicle body panel having a first portion and a second portion inclined with respect to the first portion, a power electronics module comprising a battery mounted to one of the first portion and the second portion and a DC-DC converter mounted to the other of the first portion and the second portion, such that the battery and DC-DC converter are inclined with respect to one another, the subassembly further comprising a battery temperature control circuit comprising a conduit configured to convey a coolant; wherein the conduit is configured for fluid connection with a heat exchanger; wherein at least a portion of the conduit is located or extends between the battery and the DC-DC converter.

A further aspect relates to a vehicle comprising the vehicle temperature control assembly, the mild hybrid electric vehicle temperature control assembly, the electric vehicle temperature control system, the mild hybrid electric vehicle temperature control system, the vehicle temperature control circuit, mild hybrid electric vehicle battery temperature control assembly or vehicle subassembly described above.

A further aspect relates to a method of using the vehicle temperature control assembly, the mild hybrid electric vehicle temperature control assembly, the electric vehicle temperature control system, the mild hybrid electric vehicle temperature control system, the vehicle temperature control circuit, mild hybrid electric vehicle battery temperature control assembly or vehicle subassembly described above.

A further aspect relates to a method of controlling the temperature of a battery of a vehicle, the vehicle comprising: a heat exchanger; a battery temperature control circuit; and a vehicle air conditioning circuit having an engine driven compressor; wherein the heat exchanger comprises a first fluid channel in fluid communication with the battery temperature control circuit for receiving coolant therefrom and a second fluid channel in fluid communication with the vehicle air conditioning circuit for receiving refrigerant therefrom; wherein the method comprises: conveying a coolant through the battery temperature control circuit and the heat exchanger; conveying a refrigerant through the vehicle air conditioning circuit and heat exchanger; and transferring heat between the coolant and the refrigerant via the heat exchanger.

A further aspect relates to a method of controlling the temperature of a battery of a vehicle, the vehicle comprising: a heat exchanger; a battery temperature control circuit; and a vehicle air conditioning circuit having an internal combustion engine driven compressor; wherein the heat exchanger comprises a first fluid channel in fluid communication with the battery temperature control circuit for receiving coolant therefrom and a second fluid channel in fluid communication with the vehicle air conditioning circuit for receiving refrigerant therefrom; wherein the method comprises: conveying a coolant through the battery temperature control circuit and the heat exchanger; conveying a refrigerant through the vehicle air conditioning circuit and heat exchanger; and transferring heat between the coolant and the refrigerant via the heat exchanger.

A further aspect relates to a method of controlling the temperature of a battery of a vehicle, the vehicle comprising: a heat exchanger; a battery temperature control circuit in fluid communication with the heat exchanger; and a vehicle air conditioning circuit in fluid communication with the heat exchanger, wherein the vehicle air conditioning circuit comprises an engine driven compressor; wherein the method comprises: conveying a coolant through the battery temperature control circuit and the heat exchanger; conveying a refrigerant through the vehicle air conditioning circuit and heat exchanger; and transferring heat between the coolant and the refrigerant via the heat exchanger.

A further aspect relates to a method of controlling the temperature of a battery of a mild hybrid electric vehicle, the vehicle comprising: a heat exchanger; a battery temperature control circuit in fluid communication with the heat exchanger; and a vehicle air conditioning circuit in fluid communication with the heat exchanger, wherein the vehicle air conditioning circuit comprises an engine driven compressor; wherein the method comprises: conveying a coolant through the battery temperature control circuit and the heat exchanger; conveying a refrigerant through the vehicle air conditioning circuit and heat exchanger; and transferring heat between the coolant and the refrigerant via the heat exchanger.

A further aspect relates to a method of controlling the temperature of a battery of a vehicle, the vehicle comprising the vehicle temperature control assembly, the mild hybrid electric vehicle temperature control assembly, the electric vehicle temperature control system, the mild hybrid electric vehicle temperature control system, the vehicle temperature control circuit, mild hybrid electric vehicle battery temperature control assembly or vehicle subassembly described above, wherein the method comprises: conveying a coolant through the battery temperature control circuit and the heat exchanger; conveying a refrigerant through the vehicle air conditioning circuit and heat exchanger; and transferring heat between the coolant and the refrigerant via the heat exchanger.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the disclosure will now be described, by way of example only, with reference to the accompanying drawings, in which.

DETAILED DESCRIPTION

Figure 1:
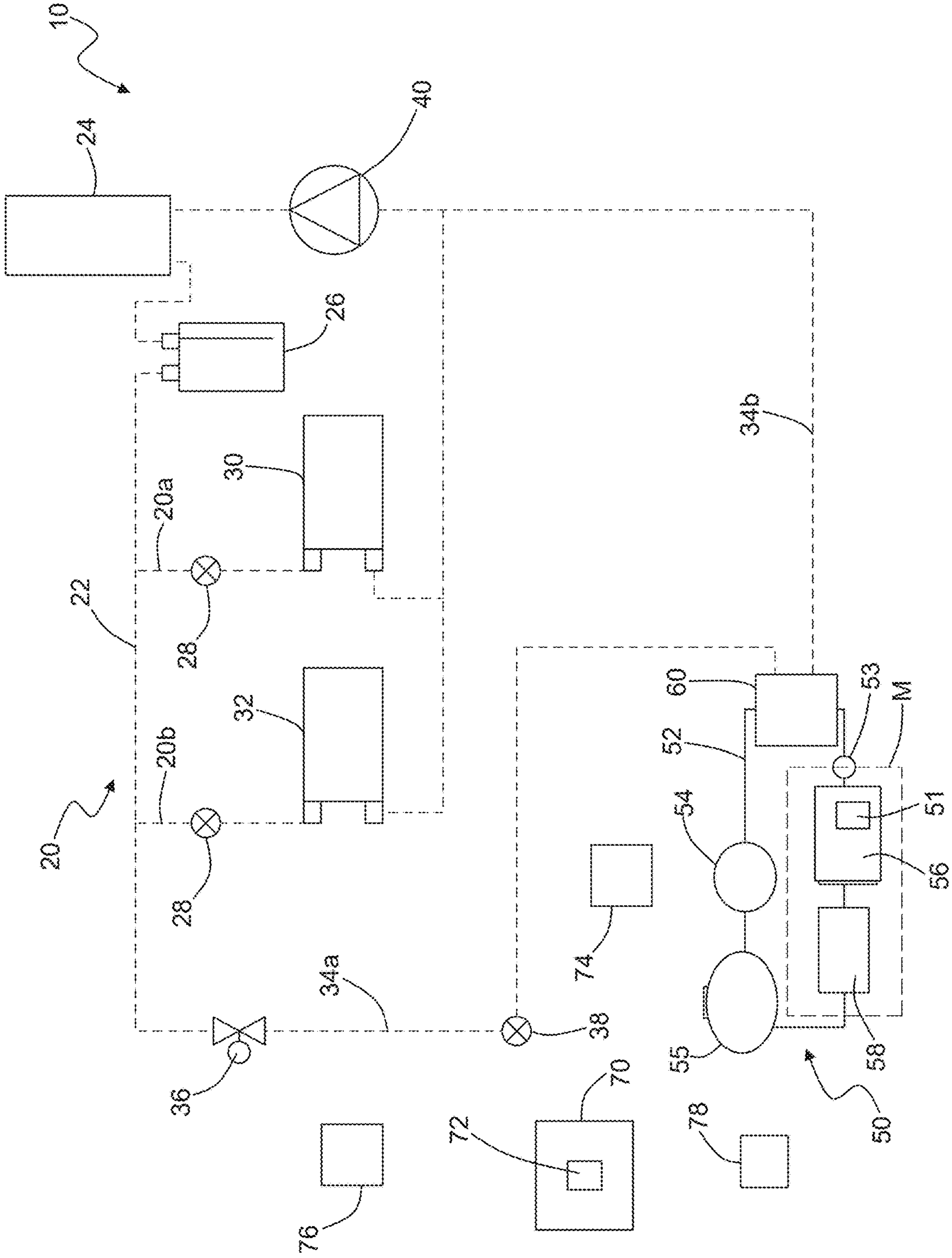
FIG. 1 shows a schematic of a vehicle temperature control assembly according to an embodiment of the invention.

A vehicle temperature control assembly or vehicle temperature control system (hereinafter vehicle temperature control assembly) 10 in accordance with an embodiment of the disclosure is described herein with reference to accompanying FIG. 1. The vehicle temperature control assembly 10 may be incorporated into a mild hybrid electric vehicle (MHEV).

The vehicle temperature control assembly 10 may include a vehicle air conditioning circuit 20 having an engine driven compressor 40. The vehicle air conditioning circuit 20 may be a conventional air conditioning circuit and is arranged to contain a refrigerant, as will be described in greater detail below. The engine driven compressor 40 may be an internal combustion engine driven compressor in this embodiment. The vehicle temperature control assembly 10 may further include a battery temperature control circuit 50 arranged to contain a coolant configured to regulate the temperature of a battery of a MHEV.

A heat exchanger 60, which may be a plate heat exchanger, may provide an interface between the vehicle air conditioning circuit 20 and the battery temperature control circuit 50. The heat exchanger 60 may include a first fluid channel in fluid communication with the battery temperature control circuit 50 for receiving coolant therefrom and a second fluid channel in fluid communication with the vehicle air conditioning circuit 20 for receiving refrigerant therefrom so as to transfer heat therebetween.

Looking to the vehicle air conditioning circuit 20 in greater detail there may be provided a closed-loop system having a conduit 22. Refrigerant within the conduit 22 may be conveyed around the circuit 20 by the engine driven compressor 40. From the compressor 40, the refrigerant may be passed to a condenser 24, and then on to a receiver/drier 26. Downstream of the receiver/drier 26 the circuit 20 may split into two branches, a rear branch 20*a* and a front branch 20*b*. Each of the branches 20*a*, 20*b* may include a respective expansion valve 28, through which the refrigerant is expanded before entering a rear evaporator 30 in the case of the rear branch 20*a* and a front evaporator 32 in the case of the front branch 20*b*. The branches 20*a*, 20*b* re-combine downstream of the evaporators 30, 32 before entering the compressor 40. It will be appreciated that the terms "rear" and "front" need not limit the location or position of the branches and/or evaporators within a vehicle and/or relative to one another. Furthermore, the vehicle air conditioning circuit 20, when forming part of the vehicle temperature control assembly 10, may be operable within an ambient temperature range of 5° F. to 122° F. (−15° C. to 50° C.).

The vehicle temperature control assembly 10 may allow the vehicle air conditioning circuit 20 to be operated at an ambient temperature lower than conventional or prior art systems, i.e. down to an ambient temperature of 5° F. (−15° C.). This is due to conventional systems experiencing suction pressure limitations governed by minimum refrigerant temperatures at the outlet of the evaporator(s). The described vehicle temperature control assembly 10 may provide a store of thermal energy, ensuring that thermal energy is maintained within the refrigerant and/or coolant, such that they are held at a temperature much greater than the ambient temperature, e.g. such that suction pressures are maintained, and a wider ambient temperature operational window is achievable.

As stated above, the compressor 40 may be an engine driven compressor in this embodiment. The compressor 40 may include an engine coupling, e.g. for coupling the compressor to an output of an internal combustion engine. The engine coupling may include a pulley or gear. The engine coupling may include a belt e.g. arranged to couple a pulley of the compressor and pulley of the internal combustion engine. The engine coupling may include a chain e.g. arranged to couple a gear of the compressor and a gear of the internal combustion engine. The compressor 40 may include one or more reducer gears, e.g. arranged to adjust a gear ratio between the internal combustion engine and the compressor 40.

The vehicle air conditioning circuit 20 may include a further branch having a first line 34*a* leading into and in fluid communication with the second fluid channel of the heat exchanger 60 and a second line 34*b* extending from the heat exchanger 60. The second line 34*b* may re-combine with the vehicle air conditioning circuit 20 upstream of the compressor 40. The vehicle air conditioning circuit 20 may be in fluid communication with the heat exchanger 60 via a valve 36, which may be a solenoid valve, a shut-off valve or a choke valve. The valve 36 may alternatively be referred to as a flow control valve and may be controllable between open and closed positions to control fluid flow between the vehicle air conditioning circuit 20 and the heat exchanger 60.

The first line 34*a* may also include an expansion valve 38 downstream of the valve 36, such that the expansion valve 38 may be positioned between the valve 36 and the heat exchanger 60. The refrigerant in the conduit 22 may be expanded and cooled as it passes through the expansion valve 38. It will be appreciated that the valve 36 and the expansion valve 38 are separate and distinct valves in this embodiment.

Now looking to the battery temperature control circuit 50 in greater detail, there may be provided a closed-loop system having a conduit 52. Coolant within the conduit 52 may be conveyed around the circuit 50 and through the heat exchanger 60 by a pump 54. As will be described in greater detail below, at least a portion of the battery temperature control circuit 50, and in particular the conduit 52, may be configured to extend around and/or through a housing of a battery 56 and/or around and/or through a housing of a DC-DC converter 58. The battery 56 and the DC-DC converter 58 may together form part of a power electronics module M, as indicated by the dashed box in FIG. 1. The battery 56 may include a battery temperature sensor 51 configured to determine a, e.g. operational, temperature of the battery 56, in use, or generate a signal representative of a temperature of the battery 56, in use.

A further temperature sensor 53 may be located between the heat exchanger 60 and the battery 56 and may be configured to determine the temperature of the coolant within the conduit 52, or generate a signal representative of a temperature of the coolant within the conduit 52. A degas tank 55 may be located between the DC-DC converter 58 and the heat exchanger 60, and the pump 54 may be positioned between the degas tank 55 and the heat exchanger 60.

As will be described in greater detail below, the temperature of the coolant within the conduit 52 will change during operation of the vehicle temperature control assembly 10. This may be due to an exchange of heat between the refrigerant within the conduit 22 and the coolant within the conduit 52 via the heat exchanger 60 and/or the operational state of the battery 56 and/or DC-DC converter 58.

The vehicle temperature control assembly 10 may further include a controller, central processing unit (CPU), control module or processing module (hereinafter CPU) 70. The CPU 70 may include a processor 72. It will be appreciated that the processor 72 may be a standalone component that may not form part of a CPU 70.

The battery temperature sensor 51 may be operatively connected to the CPU 70. The CPU 70 may also be operatively connected with a battery control circuit controller 74. The battery control circuit controller 74 may be configured to control an operational state of the pump 54. The battery control circuit controller 74 may be operatively connected to the pump 54. The operational state of the pump 54 may include an active/inactive state of the pump 54 or a flow rate of coolant through the pump 54 amongst other foreseeable operational parameters. The battery temperature sensor 51 may be operatively connected to the CPU 70 via the battery control circuit controller 74. The battery temperature sensor 51 and/or battery control circuit controller 74 may include a wired connection to the CPU 70 and/or processor 72. Alternatively, the temperature sensor 51 and/or battery control circuit controller 74 may include a transceiver for connection and/or communication with the CPU 70 or processor 72.

The CPU 70 may also be operatively connected with an air conditioning circuit controller 76. The air conditioning circuit controller 76 may be operatively connected to the valve 36. The air conditioning circuit controller 76 may be configured to control an operational state of the valve 36. The operational state of the valve 36 may include an open/closed state, a % open state or a % closed state of the valve 36.

There may also be provided an ambient temperature sensor 78 configured to determine an ambient temperature, in use, or generate a signal representative of an ambient temperature, in use. The ambient temperature may be a temperature external of a vehicle within which the vehicle temperature control assembly 10 is installed.

In use, the processor 72 may be configured to receive one or more signals representative of a measured battery temperature from the battery temperature sensor 51. The processor 72 may receive one or more signals representative of the operational state of the pump 54 from the battery control circuit controller 74. The processor 72 may then change the operational state of the pump 54 in dependence on said measured battery temperature. The operational state of the pump 54 may be changed to either increase a flow rate of coolant being conveyed around the battery temperature control circuit 50, or if it is determined that the pump 54 is in an inactive state, activate the pump 54. It will be appreciated that the operational state of the pump 54 may be changed as described e.g. if it is determined that the temperature of the battery 56 is too high or greater than a predetermined threshold and/or the temperature of the coolant is too high or greater than a predetermined threshold as indicated by the temperature sensor 53.

In some embodiments, the processor 72 may be configured to receive one or more signals representative of a measured battery temperature from the battery temperature sensor 51. In dependence on the measured battery temperature, the processor 72 may be configured to enter the vehicle temperature control assembly 10 into a battery cooling mode by sending a cooling request signal to the air conditioning circuit controller 76 to open the valve 36 in order to convey refrigerant through the heat exchanger 60. It will be appreciated that the battery cooling mode may be entered e.g. if it is determined that the temperature of the battery 56 is too high or greater than a predetermined threshold and/or the temperature of the coolant is too high or greater than a predetermined threshold as indicated by the temperature sensor 53.

More specifically, the battery cooling mode may be entered if the temperature of the battery 56 is greater than an upper threshold battery temperature. The processor 72 may compare the measured battery temperature with a battery temperature threshold. In the cooling mode, there may be an exchange of heat between the refrigerant within the conduit 22 and the coolant within the conduit 52 via the heat exchanger 60, e.g. such that heat is removed from the coolant within the conduit 52 thereby cooling the battery 56.

In some embodiments, the processor 72 and/or air conditioning circuit controller 76 may be configured to receive one or more signals representative of an ambient temperature from the ambient temperature sensor 78. The air conditioning circuit controller 76 may be configured to open the valve 36 if the ambient temperature is within a predetermined temperature range, e.g. 5° F. to 122° F. (−15° C. to 50° C.). In the event that the vehicle temperature control assembly 10 is in or is instructed to enter a battery cooling mode, the air conditioning circuit controller 76 is configured to reject a request from the processor 72 to change the position of the valve 36 (e.g. open the valve) if the ambient temperature is not within a predetermined temperature range, e.g. 5° F. to 122° F. (−15° C. to 50° C.).

In some embodiments, upon receipt of a cooling request signal from the processor 72, the air conditioning circuit controller 76 may be configured to determine the operational state of the engine driven compressor 40 and the ambient temperature from the ambient temperature sensor 78. The engine driven compressor 40 may be operatively connected with the processor 72 and/or the air conditioning circuit controller 76. The air conditioning circuit controller 76 may receive a signal representative of the operational state of the engine driven compressor 40 from the engine driven compressor 40 or from the processor 72. If it is determined that the engine driven compressor 40 is in an active state, and the ambient temperature is greater than a predetermined ambient temperature threshold, the air conditioning circuit controller 76 may be configured to reject the cooling request. The air conditioning circuit controller 76 may reject the cooling request by controlling the valve 36 (e.g. by closing the valve if it is in an open state) in order to stop refrigerant from flowing through the heat exchanger 60. The air conditioning circuit controller 76 may reject the cooling request by maintaining the valve 36 in the inactive (e.g. closed) state if the valve 36 is already in an inactive (e.g. closed) state.

In use, the processor 72 may determine that the measured battery temperature is greater than a critical threshold battery temperature. The critical threshold battery temperature may be greater than the upper threshold battery temperature. If it is determined that the measured battery temperature is greater than the critical threshold battery temperature the processor 72 may be configured to send an urgent cooling request signal to the air conditioning circuit controller 76.

In some embodiments, upon receipt of an urgent cooling request signal from the processor 72, the air conditioning circuit controller 76 may be configured to determine the operational state of the engine driven compressor 40 and the ambient temperature from the ambient temperature sensor 78. If it is determined that the engine driven compressor 40 is in an active state, and the ambient temperature is greater than a predetermined ambient temperature threshold, the air conditioning circuit controller 76 may be configured to intermittently open and close the valve 36 in a pulsed manner.

In use, the processor 72 may be configured to receive one or more signals representative of a measured battery temperature from the battery temperature sensor 51. The processor 72 may also be configured to receive one or more signals representative of an ambient temperature from the ambient temperature sensor 78. In dependence on the measured battery temperature and the ambient temperature, the processor 72 may be configured to enter the vehicle temperature control assembly 10 into a battery warming mode. More specifically, if the measured battery temperature is lower than a lower threshold battery temperature and the ambient temperature is lower than ambient temperature threshold the battery warming mode may be entered. In the battery warming mode the processor 72 may change an operational state of the pump 54 so as to convey coolant around the battery temperature control circuit 50 in order to heat the coolant and battery 56. If it is determined that the pump 54 is in an inactive state, the processor 72 may activate the pump 54. If it is determined that the pump 54 is in an active state, the processor 72 may maintain the pump 54 in the active state. It will be appreciated that in the battery warming mode, heat is transferred from the battery 56 to the coolant which remains within the battery temperature control circuit 50. This heat would otherwise be wasted, and utilising it removes the need to provide an external heater to heat the battery 56 when required.

In or when entering the battery warming mode, the processor 72 may be configured to receive one or more signals representative of the operational state of the valve 36. For example, if it is determined that the valve 36 is in an open state, the processor 72 may be configured to send a warming request signal to the air conditioning circuit controller 76 to close the valve 36 in order to stop refrigerant from flowing through the heat exchanger 60. If it is determined that the valve 36 is in the closed state, the processor 72 may be configured to send a warming request signal to the air conditioning circuit controller 76 to maintain the valve 36 in the closed state.

Figure 2:
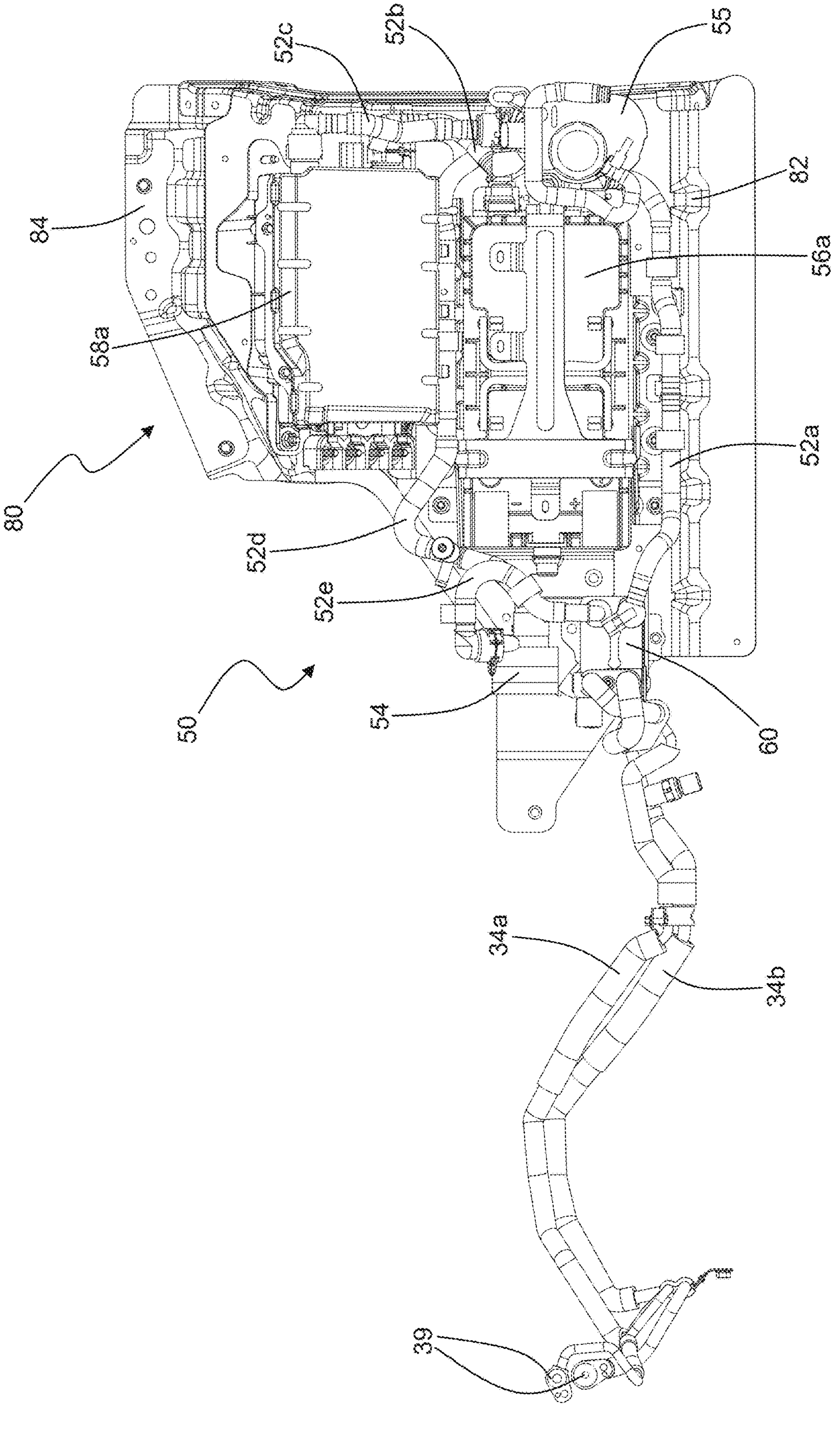
FIG. 2 shows a plan view of part of a vehicle temperature control assembly according to an embodiment of the invention.
Figure 3:
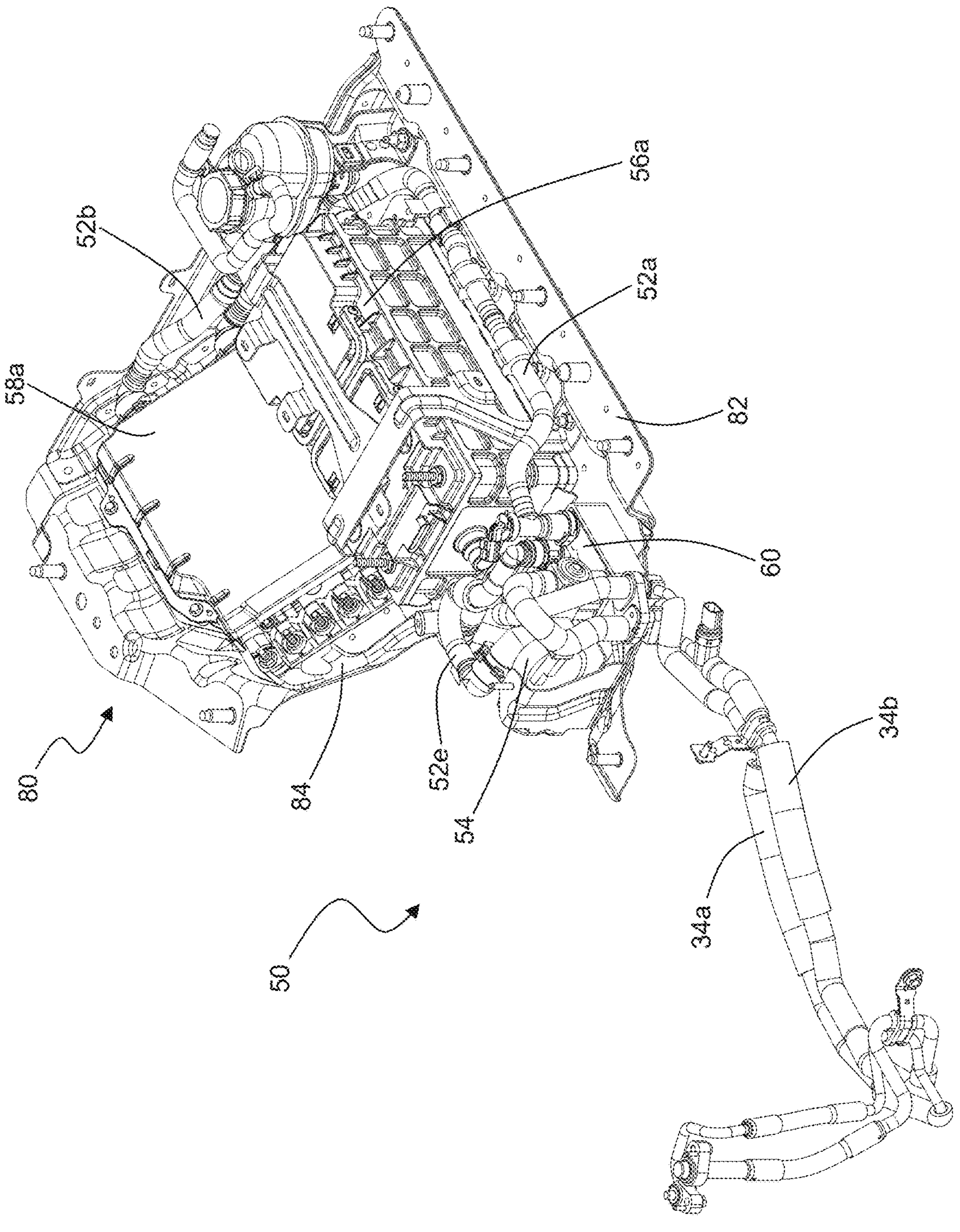
FIG. 3 shows a perspective view of the assembly of FIG. 2.
Figure 4:
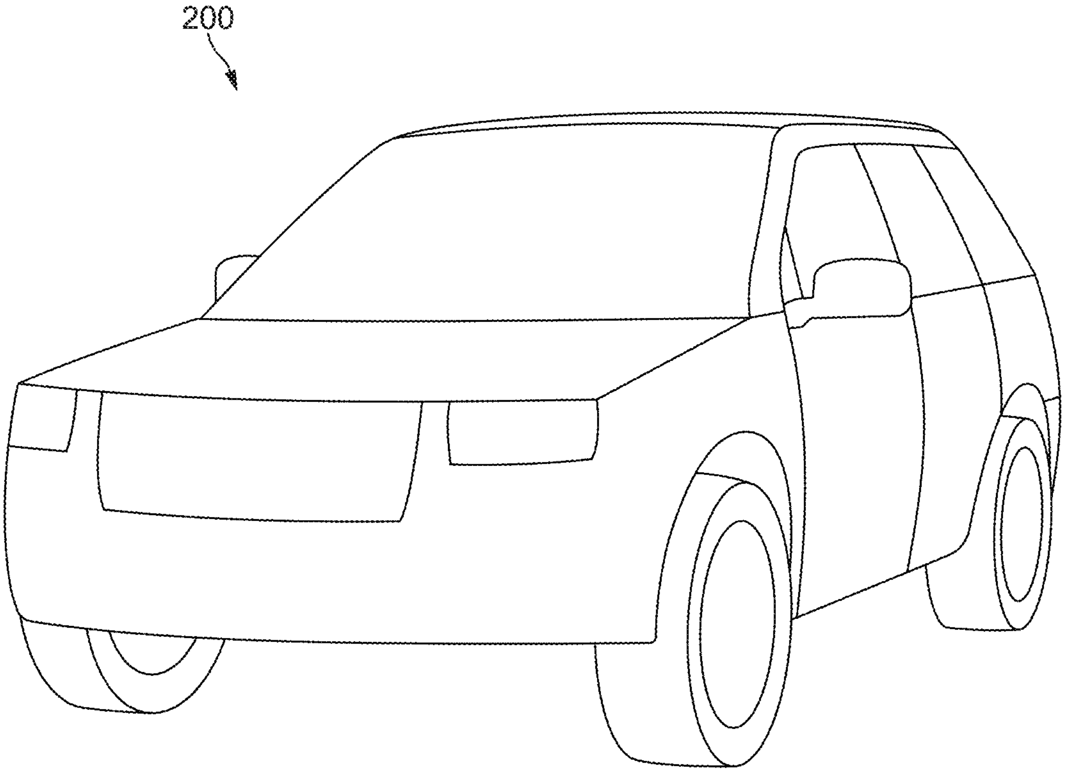
FIG. 4 shows a vehicle in accordance with an embodiment of the invention.

FIGS. 2 and 3 illustrate a part of the vehicle temperature control assembly 10 as may be incorporated into a vehicle 200 (FIG. 4). Like features to those of the schematic shown in FIG. 1 will be denoted by like references. It will be appreciated that the temperature control assembly 10 of FIGS. 2 and 3 is shown absent the vehicle air conditioning circuit 20. Instead, there is shown the first line **34*a* leading into the heat exchanger 60 and the second line 34*b* extending from the heat exchanger 60. The first and second lines 34*a*, 34*b* are shown with connectors 39 at their free ends which may be for connecting into the vehicle air conditioning circuit 20**.

As is shown in FIGS. 2 and 3, each of the battery 56, DC-DC converter 58, heat exchanger 60, pump 54 and degas tank 55 may be mounted to a vehicle body panel 80. The vehicle body panel 80 may have a first portion 82 and a second portion 84 inclined with respect to the first portion 82. As is shown in FIGS. 2 and 3, the battery 56, heat exchanger 60, pump 54 and degas tank 55 are mounted to the first portion 82 and the DC-DC converter 58 is mounted to the second portion 84. As such, the battery 56 and the DC-DC converter 58 may be inclined with respect to one another.

The battery 56 may include a battery housing **56*a* and the DC-DC converter 58 may include a converter housing 58*a*. In the present embodiment, the conduit 52 of the battery temperature control circuit 50 may have a first portion 52*a* extending from the heat exchanger 60 into the battery housing 56*a*. It will be appreciated that a portion of the conduit may follow a path within the battery housing 56*a* so as to provide cooling to the battery 56. A second portion 52*b* of the conduit 52 may extend from the battery housing 56*a* to the converter housing 58*a*. It will be appreciated that a portion of the conduit may follow a path within the converter housing 58*a* so as to provide cooling to the DC-DC converter 58. A third portion 52*c* of the conduit 52 may extend from the converter housing 58*a* to the degas tank 55 and a fourth portion 52*d* of the conduit may extend from the degas tank 55 to the pump 54. Finally, the battery temperature control circuit 50 may be completed by a fifth portion 52*e* of the conduit 52 that may extend from the pump 54 to the heat exchanger 60. A portion of the conduit 52, and more specifically the fourth portion 52*d*, may be located between the battery 56 and the DC-DC converter 58**.

FIG. 4 illustrates a vehicle 200 according to an embodiment of the present invention. The vehicle 200 is a MHEV in this embodiment and comprises a vehicle temperature control assembly 10 as illustrated in FIGS. 1 to 3.

It will be appreciated that various changes and modifications can be made to the present disclosure without departing from the scope of the present application.

The invention claimed is:

1. A vehicle temperature control assembly, comprising:

a heat exchanger;

a processor;

a battery temperature control circuit; and a vehicle air conditioning circuit having an engine driven compressor;

wherein the heat exchanger comprises a first fluid channel in fluid communication with the battery temperature control circuit for receiving coolant therefrom and a second fluid channel in fluid communication with the vehicle air conditioning circuit for receiving refrigerant therefrom so as to transfer heat therebetween, wherein fluid communication between the vehicle air conditioning circuit and the heat exchanger is controllable via a valve, wherein upon receipt of a cooling request signal from the processor, the vehicle air conditioning circuit is configured to determine the operational state of the engine driven compressor and the ambient temperature; and further wherein if it is determined that the engine driven compressor is in an active state, and the ambient temperature is greater than a predetermined ambient temperature threshold, the vehicle air conditioning circuit is configured to reject the cooling request by:

if the valve is in an open state, closing the valve in order to stop refrigerant from flowing through the heat exchanger; or if the valve is in a closed state, maintaining the valve in the closed state.

2. The vehicle temperature control assembly according to claim 1, wherein the engine driven compressor comprises an engine coupling.

3. The vehicle temperature control assembly according to claim 1, wherein the vehicle air conditioning circuit is in fluid communication with the heat exchanger via an expansion valve.

4. The vehicle temperature control assembly according to claim 1, wherein at least a portion of the battery temperature control circuit is configured to extend around and/or through a battery housing, extend around and/or through a DC-DC converter housing and/or extend between a battery and a converter.

5. The vehicle temperature control assembly according to claim 1, wherein the vehicle air conditioning circuit is operable within an ambient temperature range of 5° F. to 122° F.

6. The vehicle temperature control assembly according to claim 1, wherein the battery temperature control circuit comprises a pump configured to convey the coolant around the battery temperature control circuit and through the heat exchanger.

7. The vehicle temperature control assembly according to claim 6, further comprising:

a battery temperature sensor configured to determine the temperature of a battery, in use; and a battery temperature control circuit controller configured to control an operational state of the pump, wherein the processor is configured to:

receive one or more signals representative of a measured battery temperature from the battery temperature sensor; and in dependence on the measured battery temperature, change the operational state of the pump to either:

increase a flow rate of coolant being conveyed around the battery temperature control circuit; or if the pump is in an inactive state, activate the pump.

8. The vehicle temperature control assembly according to claim 7, wherein:

if the measured battery temperature is greater than a critical threshold battery temperature, wherein the critical threshold battery temperature is greater than the upper threshold battery temperature, the processor is configured to send an urgent cooling request signal to the air conditioning circuit controller; and further wherein in response to the urgent cooling request signal, if it is determined that the ambient temperature is greater than a predetermined ambient temperature threshold and the engine driven compressor is in an active state, the vehicle air conditioning circuit is configured to intermittently open and close the valve in a pulsed manner.

9. A vehicle temperature control system, comprising:

a heat exchanger;

a battery temperature control circuit in fluid communication with the heat exchanger and configured to convey a coolant therethrough;

a battery temperature sensor configured to determine the temperature of a battery, in use;

a vehicle air conditioning circuit in fluid communication with the heat exchanger and configured to convey a refrigerant therethrough, wherein the vehicle air conditioning circuit comprises:

an engine driven compressor;

a valve configured to control the fluid communication between the vehicle air conditioning circuit and the heat exchanger; and an air conditioning circuit controller configured to control an operational state of the valve;

wherein the vehicle temperature control system is configured to control transfer of heat between the coolant and the refrigerant via the heat exchanger; and a processor operatively connected to the battery temperature sensor and the air conditioning circuit controller, wherein upon receipt of a cooling request signal from the processor, the air conditioning circuit controller is configured to determine the operational state of the engine driven compressor and the ambient temperature; and further wherein if it is determined that the engine driven compressor is in an active state, and the ambient temperature is greater than a predetermined ambient temperature threshold, the air conditioning circuit controller is configured to reject the cooling request by:

if the valve is in an open state, closing the valve in order to stop refrigerant from flowing through the heat exchanger; or if the valve is in a closed state, maintaining the valve in the closed state.

10. The vehicle temperature control system according to claim 9, further comprising:

wherein the processor is configured to:

receive one or more signals representative of a measured battery temperature from the battery temperature sensor; and in dependence on the measured battery temperature, enter a battery cooling mode by sending the cooling request signal to the air conditioning circuit controller to control the valve in order to convey refrigerant through the heat exchanger.

11. The vehicle temperature control system according to claim 10, wherein the processor is further configured to:
compare the measured battery temperature with an upper threshold battery temperature; and
if the measured battery temperature is greater than the upper threshold battery temperature, enter the battery cooling mode.

12. The vehicle temperature control system according to claim 11, further comprising an ambient temperature sensor operatively connected to the processor, wherein the ambient temperature sensor is configured to determine the ambient temperature, in use.

13. The vehicle temperature control system according to claim 12, wherein the air conditioning circuit controller is configured to control the valve if the ambient temperature is within a predetermined temperature range.

14. The vehicle temperature control system according to claim 12, wherein:
if the measured battery temperature is greater than a critical threshold battery temperature, wherein the critical threshold battery temperature is greater than the upper threshold battery temperature, the processor is configured to send an urgent cooling request signal to the air conditioning circuit controller; and further wherein
in response to the urgent cooling request signal, if it is determined that the ambient temperature is greater than a predetermined ambient temperature threshold and the engine driven compressor is in an active state, the air conditioning circuit controller is configured to intermittently open and close the valve in a pulsed manner.

15. The vehicle temperature control system according to claim 12, wherein the battery temperature control circuit comprises a pump configured to convey the coolant around the battery temperature control circuit and through the heat exchanger,
wherein the processor is configured to:
receive one or more signals representative of a measured battery temperature from the battery temperature sensor;
compare the measured battery temperature with a lower threshold battery temperature;
receive an ambient temperature from the ambient temperature sensor; and
if the measured battery temperature is lower than the lower threshold battery temperature and the ambient temperature is lower than an ambient temperature threshold, enter a battery warming mode whereby an operational state of the pump is changed so as to convey coolant around the battery temperature control circuit in order heat the coolant.

16. The vehicle temperature control system according to claim 15, wherein:
the processor is configured to receive one or more signals representative of the operational state of the valve; and further wherein
if it is determined that the valve is in an open state, the processor is configured to send a warming request signal to the air conditioning circuit controller to close the valve in order to stop refrigerant from flowing through the heat exchanger; or
if the valve is in a closed state, the processor is configured to send a warming request signal to the air conditioning circuit controller to maintain the valve in the closed state.

17. A vehicle temperature control assembly comprising:
a power electronics module comprising a battery and a DC-DC converter;
a battery temperature control circuit comprising a conduit configured to convey a coolant;
a heat exchanger;
a vehicle air conditioning circuit having an engine driven compressor; and
a valve configured to control the fluid communication between the vehicle air conditioning circuit and the heat exchanger; and
wherein the conduit is configured for fluid connection with the heat exchanger; and
wherein at least a portion of the conduit extends around and/or through a housing of the battery and/or around and/or through a housing of the DC-DC converter, wherein upon receipt of a cooling request signal, the vehicle air conditioning circuit is configured to determine the operational state of the engine driven compressor and the ambient temperature; and further wherein
if it is determined that the engine driven compressor is in an active state, and the ambient temperature is greater than a predetermined ambient temperature threshold, the air conditioning circuit controller is configured to reject the cooling request by:
if the valve is in an open state, closing the valve in order to stop refrigerant from flowing through the heat exchanger; or
if the valve is in a closed state, maintaining the valve in the closed state.

18. The vehicle temperature control assembly according to claim 17,
wherein the heat exchanger comprises a first fluid channel in fluid communication with the battery temperature control circuit for receiving coolant therefrom and a second fluid channel in fluid communication with the vehicle air conditioning circuit for receiving refrigerant therefrom so as to transfer heat therebetween.

19. The vehicle temperature control assembly according to claim 17, wherein at least a portion of the conduit is located between the battery and the DC-DC converter.

20. The vehicle temperature control assembly according to claim 17, further comprising a vehicle body panel having a first portion and a second portion inclined with respect to the first portion, wherein the battery is mounted to one of the first portion and the second portion and DC-DC converter is mounted to the other of the first portion and the second portion such that the battery and DC-DC converter are inclined with respect to one another.

* * * * *